United States Patent [19]

Gottlieb

[11] Patent Number: 4,466,627

[45] Date of Patent: Aug. 21, 1984

[54] SLED STRUCTURE WITH RUNNER CONNECTING TRANSVERSE LINK

[76] Inventor: Robert G. Gottlieb, 4809 W. 95th St., Overland Park, Kans. 66207

[21] Appl. No.: 339,742

[22] Filed: Jan. 15, 1982

Related U.S. Application Data

[63] Continuation-in-part of Ser. No. 280,135, Jul. 2, 1981, abandoned.

[51] Int. Cl.³ .............................................. B62B 13/12
[52] U.S. Cl. ............................ 280/21 A; 280/12 AB; 280/12 F; 280/22
[58] Field of Search .................... 280/12 F, 21 A, 22, 280/21 R, 601, 12 AB

[56] References Cited

U.S. PATENT DOCUMENTS

| | | | |
|---|---|---|---|
| 1,160,569 | 11/1915 | Bourdon et al. | 280/21 A |
| 1,367,185 | 1/1921 | Holmgren | 280/21 A |
| 1,600,735 | 9/1926 | Pederson | 280/21 A |
| 1,768,046 | 6/1930 | Fredrickson et al. | 280/12 F |
| 1,888,857 | 11/1932 | Greene | 280/21 A |
| 2,532,887 | 12/1950 | Bor | 280/21 A |
| 3,161,416 | 12/1964 | Lechene et al. | 280/21 A |
| 3,190,671 | 6/1965 | Fabris | 280/21 A |
| 3,370,862 | 2/1968 | Huffnagle | 280/21 A |
| 3,528,674 | 9/1970 | Schwarz | 280/21 A |
| 3,550,706 | 12/1970 | Watkins | 280/21 R |
| 3,777,831 | 12/1973 | Hale | 280/21 R |
| 3,783,959 | 1/1974 | Krume | 280/21 A |
| 3,827,516 | 8/1974 | Lucia | 280/21 A |
| 3,833,234 | 9/1974 | Schreiber | 280/21 A |
| 4,063,746 | 12/1977 | Hansen | 280/21 A |
| 4,114,912 | 9/1978 | Sweeney | 280/21 A |
| 4,165,087 | 8/1979 | Kagawa | 280/21 A |
| 4,324,409 | 4/1982 | Larsen | 280/12 F |
| 4,326,725 | 4/1982 | Lagervall | 280/21 A |
| 4,334,691 | 6/1982 | Scheib | 280/12 F |

FOREIGN PATENT DOCUMENTS

| | | | |
|---|---|---|---|
| 2405665 | 8/1974 | Fed. Rep. of Germany | 280/12 F |
| 54545 | 4/1933 | Norway | 280/12 F |
| 447833 | 3/1968 | Switzerland | 280/12 F |

*Primary Examiner*—David M. Mitchell
*Attorney, Agent, or Firm*—Litman, Day & McMahon

[57] ABSTRACT

A sled is provided for traversing a snow covered surface comprising an elongate frame and an elongate flexible runner pivotally mounted to each side of the frame. The runners are mounted onto the frame at a longitudinal position of the runner through which a single resultant force acts in opposition to a force exerted onto the respective runner by a snow covered surface when the sled is traversed thereacross. To provide steering, the runners are rotated about their respective mounting axes and front portions thereof are initially bent toward the direction of turn. A transverse link connects the runners at their frame mounting points assuring that both runners rotate in concert about their respective axes. Conventional snow skies are modified to act as the runners.

3 Claims, 18 Drawing Figures

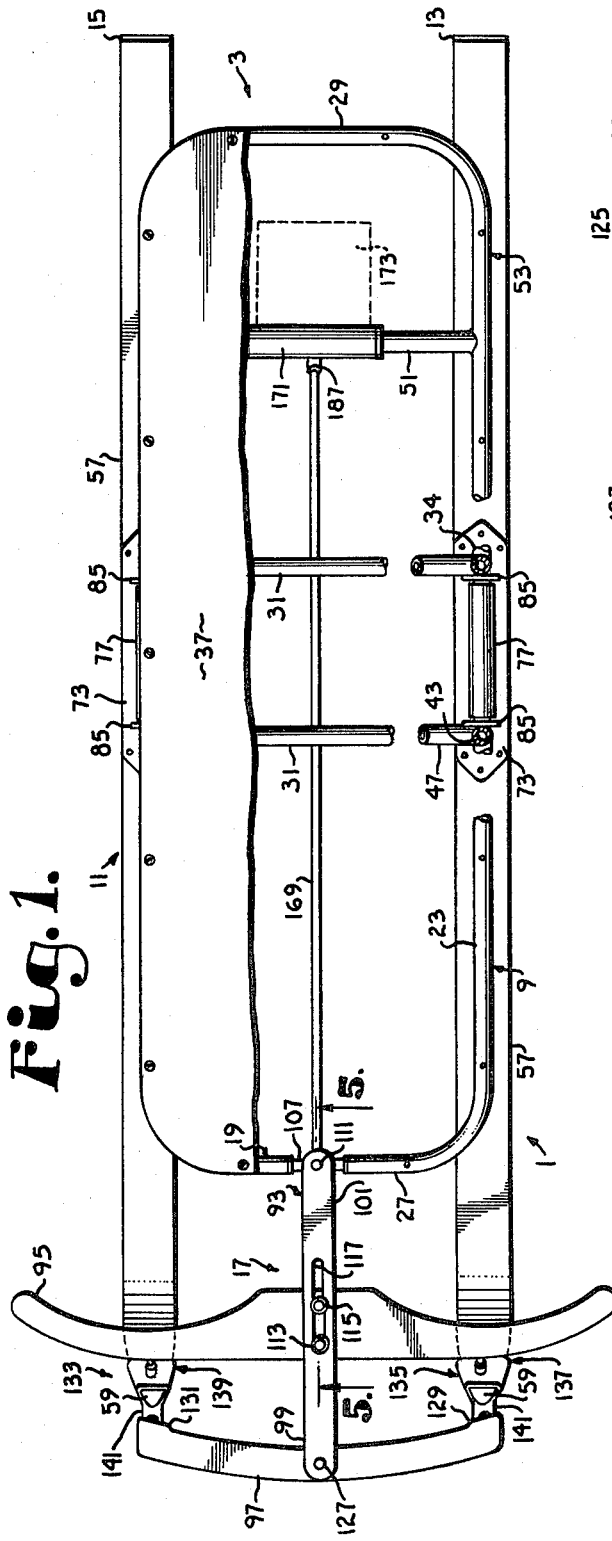
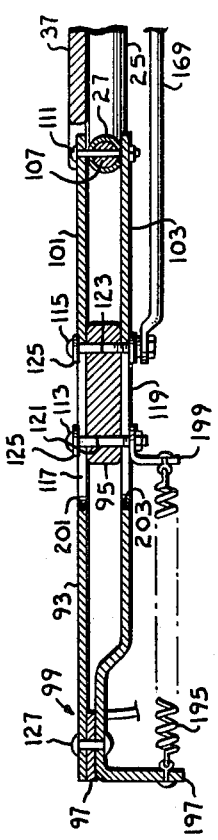
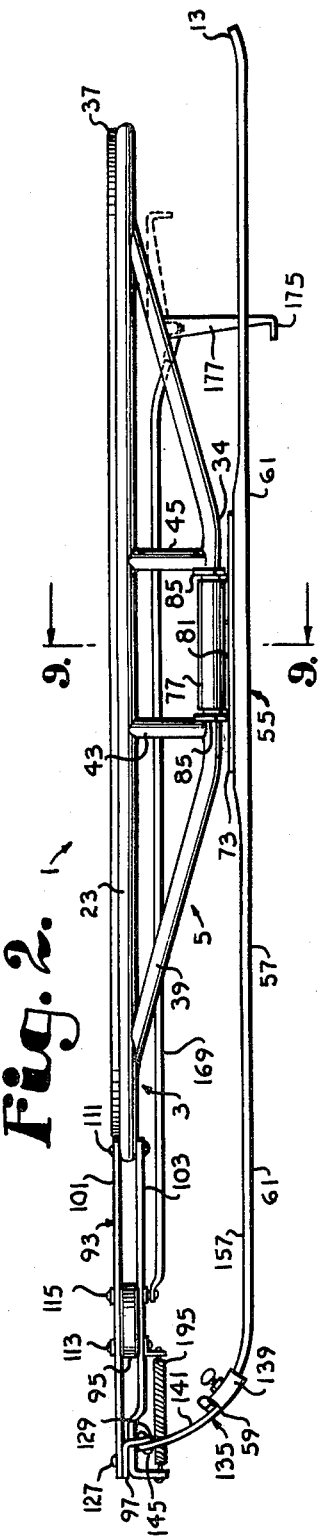

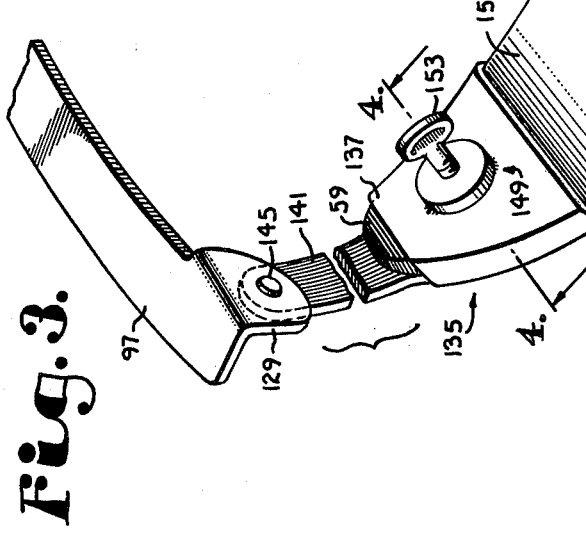

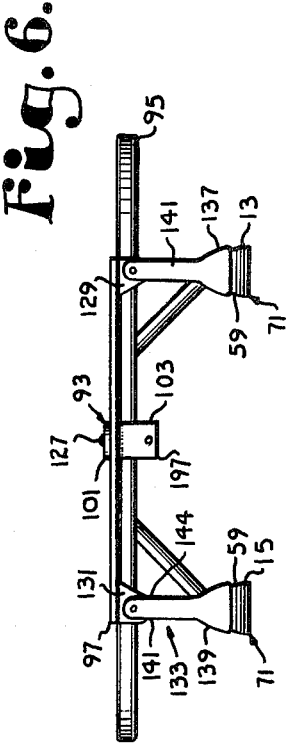
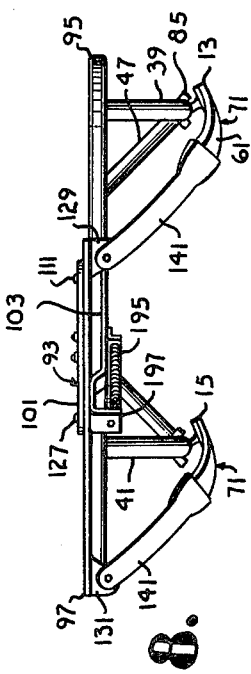
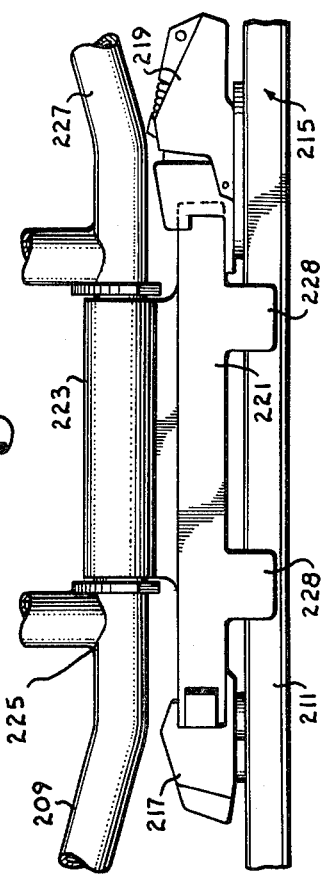
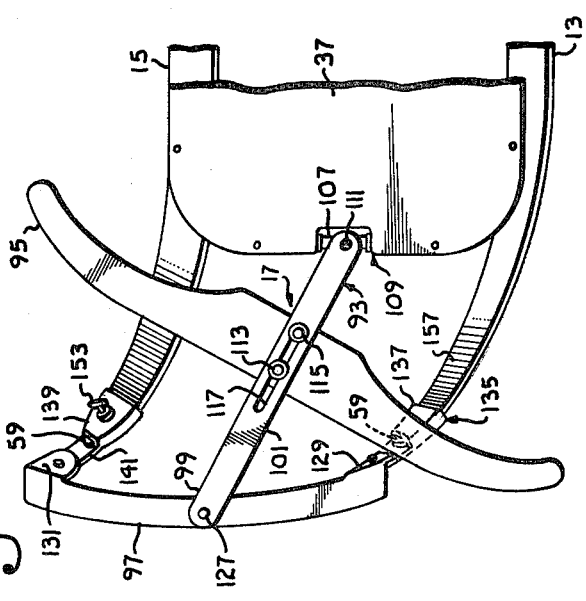
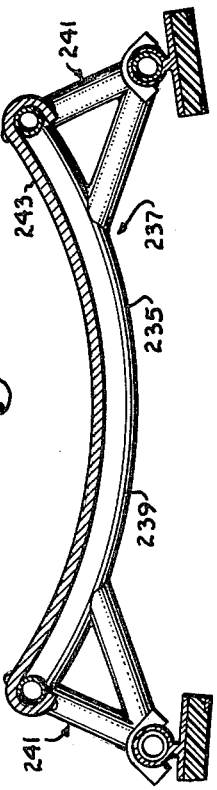

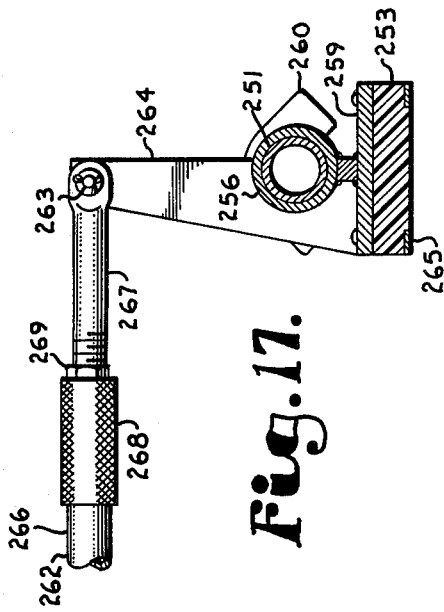
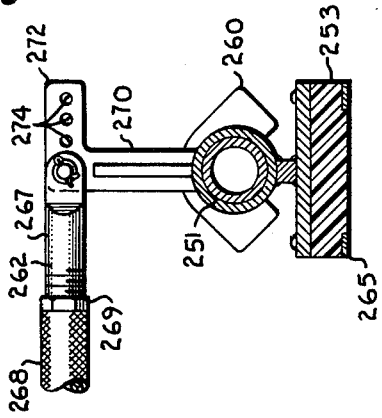
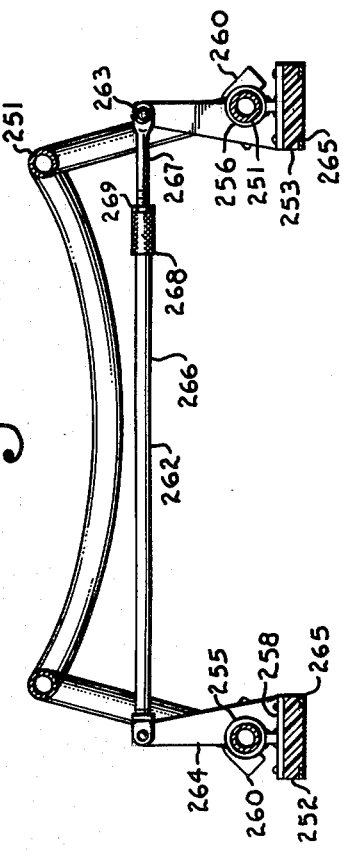
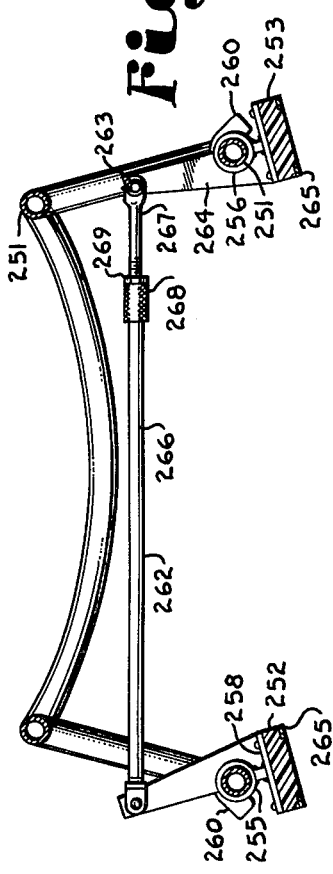
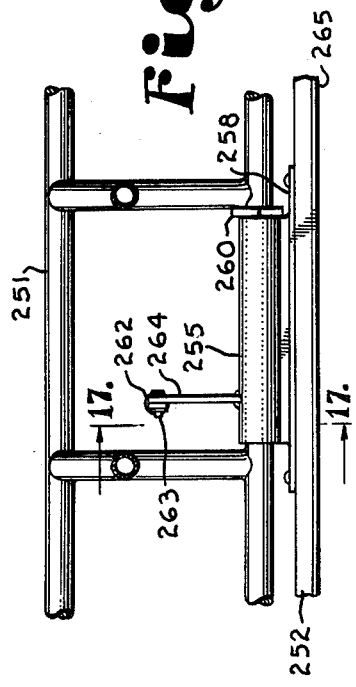

SLED STRUCTURE WITH RUNNER CONNECTING TRANSVERSE LINK

RELATED APPLICATION

This application is a continuation-in-part of application Ser. No. 280,135 entitled Sled Structure, filed July 2, 1981 and now abandoned.

BACKGROUND OF THE INVENTION

This invention relates to sled structures in general and in particular to sled structures having runners which are rotatable about a longitudinal axis thereof.

Sled structures for traversing a snow covered surface have been widely used in the past for recreation and utility. Early sled structures have elongate surface engaging rails which acted as runners. The rails were bent transversely to the sled to effectuate turns. More recent models of sleds have included elongated runners having a greater width than before and which are rotatable about a longitudinal axis to that the runners can be put on an edge thereof.

Heretofore such types of sleds have had mulitiple mounting brackets on both runners to provide a substantially stiff runner. Further, such sleds have only attempted to rotate the runners about the longitudinal axes thereof and have not attempted to utilize any inherent flexing ability of the runners to increase the turning capability of the sled. Such sleds had limited turning capabilities.

OBJECTS OF THE INVENTION

Therefore, the objects of the present invention are: to provide a sled structure which is capable of increased stability and increased turning capabilities; to provide such a sled structure which includes as runners thereon conventional snow skis with the snow skis attached to the sled structure at a longitudinal position of said runners through which a resultant force acts in reaction to a force exerted on the skis by a snow surface when traversing the snow surface; to further provide such a sled structure which utilizes for turning thereof, both the ability to rotate the runners about a longitudinal axis and the ability to flex the skis as a normal ski would flex during a turn when worn by a skier; to further provide such a sled structure including a steering mechanism which, when turning both simultaneously rotates the runners about a longitudinal axis and bends a front portion of each ski toward a direction of turn; to further provide such a sled structure which includes a link means connecting the two runners to assure the runners rotate about their respective mounting axes in concert; to provide such a sled structure which includes a brake mechanism which is both selectively actuated by a user of the sled and automatically actuated if a user falls from the sled during a run with the sled; to further provide such a sled which has a mounting bracket compatible with a binding of a conventional snow ski so that a user of the sled can alternate between wearing a pair of snow skis or using the snow skis with the sled frame structure; and to provide such a sled structure which is easy to manufacture, durable in use, capable of increased stability and steering capabilities and particularly well adapted for the intended purpose thereof.

Other objects and advantages of this invention will become apparent from the following description taken in connection with the accompanying drawings wherein are set forth, by way of illustration and example, certain embodiments of this invention.

SUMMARY OF THE INVENTION

A sled structure is provided which includes an elongate frame having side frame members extending downwardly therefrom at sides thereof. An elongate flexible runner is pivotally mounted to each side frame member with the point of mounting on the runner being that point through which a resultant force acts in reaction to forces exerted on the runner when the runner is traversing a snow covered surface. The runners are preferably conventional snow skis which have been adapted to be connected to the sled frame structure.

In one embodiment, the conventional ski boot bindings on the skis are replaced with a mounting pad which has attached thereto a collar which is placed over a portion of the side frame structure allowing the runner to be rotatable about a longitudinal axis of the collar. The tips of the skis are retained in bindings which are connected to a steering mechanism upon the actuation of which the skis are rotated about their respective associated collar longitudinal axis and further, the front portions thereof are partially flexed or bent toward the direction of turning of the sled. Upon entering the turn, the skis flex as they would if worn by a skier when turning, decreasing the radius of the turn, thereby combining greater turning capabilities and stability when turning.

A brake is provided with the sled which is both automatically actuatable when a rider of the sled is disassociated therefrom as when a rider falls from the sled, and is selectively actuatable by the rider when he is riding the sled.

In a second embodiment of the sled, conventional snow skis complete with toe and heel bindings are used as the runners. A special adapter plate is provided with each sled side frame member which is accepted and retained securely in the existing ski binding. The steering mechanism ski tip binding is also selectively removable so as not to damage the skis when placed thereover. In the second embodiment, a user could use the single pair of skis both as runners of such a sled frame structure and as conventional snow skis to be worn in a conventional manner connected to the feet of a user.

In a the third embodiment of the sled a transverse link is connected to the runners to assure that when turning, the runners rotate about a longitudinal axis of their respective collar in the same direction and generally in the same degree of rotation. This provides greater stability to the sled structure by assuring that both runners are edged on the same edge.

The drawings constitute a part of this specification and include exemplary embodiments of the present invention and illustrate various objects and features thereof.

BRIEF DESCRIPTIONS OF THE DRAWINGS

FIG. 1 is a top plan view of a first embodiment of a sled structure according to the present invention with a portion of a platform thereof broken away to show details thereof.

FIG. 2 is a side elevational view of such a sled structure showing a brake mechanism thereof in a first and a second operative position.

FIG. 3 is a enlarged fragmentary perspective view of a portion of a tip of a runner of the sled.

FIG. 4 is enlarged cross-sectional view of a runner and an associated tip binding taken along line 4—4 in FIG. 3.

FIG. 5 is an enlarged cross-sectional view of a steering mechanism of such a sled taken generally along line 5—5 in FIG. 1.

FIG. 6 is a front elevational view of the sled structure.

FIG. 7 is a partial top plan view of the sled structure showing the position of the runners of the sled when turning toward the right.

FIG. 8 is a front elevational view of the sled showing the position of the runners of the sled when turning toward the right. FIG. 9 is an enlarged fragmentary cross-sectional view of the sled taken generally along line 9—9 in FIG. 2.

FIG. 10 is an enlarged fragmentary view of the sled showing the mounting of a runner on a sled frame structure.

FIG. 11 is an enlarged fragmentary side elevational view of the sled showing a brake mechanism thereof.

FIG. 12 is an enlarged fragmentary side elevational view of a second embodiment of a sled according to the present invention showing a mechanism for mounting a runner to the sled.

FIG. 13 is a generally transverse cross-sectional view of a third embodiment of a sled according to the present invention showing the frame structure thereof.

FIG. 14 is a transverse cross-sectional view of a fourth embodiment of the sled structure according to the present invention showing a transverse link connecting runners of the sled structure.

FIG. 15 is a transverse cross-sectional view of the sled structure as in FIG. 14 showing the cooperation between the transverse link and the sled runners.

FIG. 16 is a partial side elevational view of the sled structure shown in FIGS. 14 and 15.

FIG. 17 is a fragmentary, enlarged cross-sectional view of the sled structure taken along line 17—17 in FIG. 16.

FIG. 18 is a cross-sectional view of the sled structure showing a variation of a mounting bracket connecting the transverse link with runners of the sled structure.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally refers to a first embodiment of a sled structure according to the present invention. The sled structure 1 includes a generally horizontal main frame 3 having side frame members 5 extending downwardly therefrom at sides 9 and 11 thereof. An elongate flexible runner 13 and 15 is pivotally mounted to each respective side frame member 5. A steering mechanism 17 is mounted on a front portion 19 of main frame 3.

As best shown in FIGS. 1 and 2, the main frame 3 comprises parallel spaced upper side rails 23 and 25 and parallel spaced front and back rails 27 and 29. Cross bows 31 extend transversely between main frame side rails 23 and 25 and together with upper rails 23 and 25 and front and back rails 27 and 29 mount a platform 37 on which a user of the sled 1 can lie in a prone position.

The side frame members 5 each include respectively a lower side rail 39 which angles downwardly from front to back until a point approximately even with a center of the main frame 3, then runs substantially parallel to main frame side rails 23 and 25 at a middle portion 34 thereof, and then angles upwardly to contact the main frame side rails 23 and 25 near a rear portion thereof. Legs 43 and 45 extend downwardly from side rails 23 and 25 and contact the lower side rails at opposing ends of the respective middle portions 34 thereof. An angled brace member 47 is positioned between each lower side rail middle portion 34 and cross bows 31 for strength as shown in FIG. 9. A cross brace 51 is positioned between lower side rails 39 and 41 near rear portions thereof.

As shown in FIGS. 1 and 2, the runners 13 and 15 are substantially elongate and are relatively thin near the front and rear while becoming thicker near middle portions 55 thereof. The runners 13 and 15 include a substantially flat portion 57 and an upturned tip 59 at front portions thereof. Preferably, the runners 13 and 15 are conventional snow skis with any associated boot bindings (not shown) removed therefrom. The runners 13 and 15 further have a substantially flat lower surface 61 which includes thereon steel bands 65 and 67 extending along opposed side edges 69 and 71 of the runners 13 and 15 substantially along a full length thereof. The steel bands 65 and 67 are recessed into the respective runner lower surface 61 so as to be flush mounted therewith.

As stated before, the runners 13 and 15 are pivotally attached to side frame members 5. A mounting plate 73 is provided for each runner 13 and 15 and has attached thereto an associated tubular collar 77 which is telescopically recieved over the respective lower side rail middle portions 34. As such, each runner 13 and 15 can rotate about a longitudinal axis of an associated collar 77. A fillet 81 is provided between each respective mounting plate 73 and collar 77, the function of which will be explained presently. Stops 85 are provided on each lower side rail middle portion 34 and, as shown in FIG. 10, function to limit the degree of rotation of the respective runner 13 and 15 about the lower side rail middle portions 34.

The steering mechanism 17 includes a tongue 93 which extends outwardly from the main frame front rail 27, a handlebar 95 positioned transversely relative to tongue 93, and a yoke 97 attached to a front end portion 99 of tongue 93.

As best shown in FIG. 5, the tongue 93 comprises upper and lower brackets 101 and 103. The tongue 93 is attached to the main frame front rail 27 so as to be rotatable about a transverse axis therewith. As shown in FIGS. 1 and 5, a rod 107 is positioned within the main frame front rail 27 at a middle portion 109 thereof and is rotatable with respect thereto. The tongue upper and lower brackets 101 and 103 are secured to rod 107 by means of a suitable retaining fastener such as pin 111.

The tongue upper and lower brackets 101 and 103 extend forwardly from the main frame 3 and capture both the handle bar 95 and yoke 97. Pins 113 and 115 are positioned through slots 117 and 119 in tongue upper brackets 101 and 103 respectively and through bores 121 and 123 in handlebar 95. Washers 125 or the like are provided to retain the pins 113 and 115 securely within the bounds of the respective slots 117 and 119. The handlebar 95 is thus free to move in a longitudinal direction relative to the tongue 93.

The yoke 97 is retained between tongue upper and lower brackets 101 and 103 by means of a suitable fastener such as rivet 127. It is noted that pin 111 and rivet 127 are of a loose fit relative to their associated structure such that upon rotating the handlebar 95 about a vertical axis as shown in FIG. 7, the tongue is capable of being moved angularly relative to the main frame front rail 27 and yoke 97.

The yoke 97 includes at outer end portions thereof tabs 129 and 131 which are mated with respective binding 133 and 135 which engages an associated runner tip 59. The bindings 133 and 135 include a glove portion 137 and 139 respectively which is snugly received over a respective runner tip 59. Extending from each gloove 137 and 139 is an extension 141 which is secured to the associated yoke tab 129 and 131 by means of a suitable retainer such as a loose rivet 145.

As best shown in FIGS. 3 and 4, each respective binding glove 137 and 139 is secured to the respective associated runner tip 59 by means of a clamp which comprises a threaded member 149 received in a threaded aperture 151 in each glove 137 and 139. The threaded member 149 includes at an external end thereof, a suitable means for providing rotation thereto such as a head 153, and includes at an internal end, a shoe 155 which engages an upper surface 157 of each respective runner 13 and 15. The shoe is of greater cross-sectional area than the treaded member 159 and therefore allows a greater clamping force to be applied to each runner 13 and 15 with a smaller amount of pressure applied thereto. This substantially prevents marring or scratching of the respective runner upper surface 157.

A brake 165 is provided and which is activated by means of a link 169 through positioning of the handlebar 95. The brake 165 includes a collar 171 which is positioned over main frame cross-brace 51 and which is rotatable relative thereto. The brake includes a planar plow member 173 attached tangentially to the collar 171 and which terminates in curved tip portion 175. A strengthening flange 177 extends from the collar along a lower surface of the planar member 173. A tab 179 is attached to collar 171 and provides a means whereby the link 169 is attached thereto. The tab includes a generally vertical portion 181 which as shown in FIG. 11 extends downwardly from collar 171 and generally horizontal portion 183 which extends outwardly from vertical portion 181. The link 169 is attached to the tab horizontal portion by means of a suitable retainer 185. The link 169 is attached at the forward end thereof to handlebar 95 and in particular is attached to a bottom portion of pin 115 as shown in FIG. 5. A rear portion of the link 169 includes a pivot member 187 which allows the link rear portion to pivot relative to the link 169 about a transverse axis. Further, the connection of the link rear portion and the brake the tab horizontal portion 183 is of a loose fit and allows the link rear portion to rotate relative thereto about a vertical axis. As such, the rear portion of the link acts as a universal joint. The front portion of the link further is rotatable relative to the pin 115 about a vertical axis.

As shown in FIG. 2, the handlebar 95 is biased toward the front of the sled by means of a spring 195. The spring 195 is attached at one end to a tang 197 which extends downwardly from the tongue lower bracket 103 and a tab 199 which is retained in fixed relative to the handlebar by means of pin 113. The spring biases the handlebar forwardly such that the pins 113 and 115 move relative to slots 117 and 119 until they contact a forward edge 201 and 203 thereof. As seen in FIG. 2, when this occurs, the brake rotates about main frame cross piece 51 to a position wherein the brake planar member 173 assumes a position shown in solid lines in FIG. 2 and dotted lines in FIG. 11. In this position, the brake planar member tip 175 will be biased into contact with the surface upon which the sled 1 is traversing.

In use, the sled 1 is capable of allowing a user thereof to traverse a snow covered surface while providing increased stability and cornering capabilities. A user of the sled would lie prone on platform 37 and grab the handle bar 95 at both sides with a hand. As shown in FIG. 2, spring 195 biases the handlebar 95 forwardly thereby rotating the brake 165 to a position where it engages the snow surface. In order to release the brake, the user would pull rearwardly on the handlebar moving pins 113 and 115 rearwardly of slots 117 and 119 to a position where they contact a rearmost edge of slots 117 and 119. When the handlebar is thusly pulled backwardly, the brake is positioned as shown in solid lines in FIG. 11 out of contact with the snow surface. As such, the sled is capable of traversing across a snow surface.

In turning, a user will pull back the side of the handlebar 95 which is in the direction in which he wants to turn. In particular, if the user wants to turn right, he will pull back on the right side of the handlebar 95 as shown in FIG. 7. In doing so, the steering mechanism tongue 93 rotates about pin 111 which in turn forces the yoke 97 to the right. There are two effects on the runners as a result of this movement of the yoke. The first is that the runners 13 and 15 rotate about a longitudinal axis of the associated collars 73 to a position where only the right edges 71 thereof come in contact with the snow surface. Secondly, Since the runners 13 and 15 are flexible and since their longitudinal point of mounting onto the sled 1 is a substantial distance from the associated tip 59, that portion of the runners between the tips thereof 59 and their points of mounting on the frame is flexed or bent in a direction of turning. As a result of this, the right hand edges 71 of the runners 13 and 15, including that portion which is in contact with the snow surface, becomes curved in a direction of turning as shown in FIG. 7 thereby urging the sled to begin to make a right hand turn. As the sled begins to turn to the right, the natural tendency of the centrifugal force of the sled will tend to force the sled to the outside of the turn, in particular, to the left which in turn will promote more bending of the forward portion of the runners 13 and 15 thereby increasing the tendency of the sled to turn to the right. It is noted that when this occurs, the tongue 93 pivots relative to the main frame front rail 27 such that rod 107 rotates within the main frame front rail 27.

As noted, the collars 77 are spaced from each respective mounting plate 75 by a fillet 81 respectively. As such, when the runners 13 and 15 are rotated, as when turning, the center of gravity of the sled 1 is shifted inwardly of the radius of the turn thereby increasing the stability of the sled when cornering. This is as best shown in FIG. 8.

When a user desires to slow down or stop, he would force the handlebar forwardly to a position as shown in FIGS. 1 and 2. In doing so, link 169 will be urged forwardly causing the brake 165 to rotate around cross brace 51 to a position where the planar member tip 175 would engage the snow surface thereby slowing down and eventually stopping the sled. Further, if a user would inadvertently fall off the sled 1 while the sled was moving, the spring 195 would pull the link 169 forwardly such that the brake tip 175 would again contact the snow surface. As such, the brake 165 acts as an automatically actuated deadman brake or as a brake capable of being actuated by a user of the sled.

It is seen that conventional skis can be used as runners 13 and 15. If a user desires to use a pair of skis for both downhill skiing and as a part of a sled structure as shown herein, the user only needs to remove the ski boot bindings (not shown) of the skis such that the middle portions of the skis are substantially flat to allow the ski to be connected to the mounting plates 73. The skis can be connected thereto by means of a suitable fastener such as screws (not shown). After the skis are attached to the respective plate 73, the tips of the skis can be inserted in the tip binding glove portions 137 and 139 as shown in FIG. 3, and secured thereto by fastening the clamps 140 securely onto the skis. After doing so, a user is ready to use a conventional pair of snow skis as part of such a sled structure 1.

FIG. 12 shows a fragmentary view of a second embodiment of sled structure according to the present invention generally designated by the reference numeral 209. The sled 209 includes a frame steering mechanism, platform, and brake (all not shown) all as set forth in the sled structure 1, shown in FIGS. 1 through 11. The sled 209 is designed to use as runners thereof, conventional snow skis 211 which are complete with ski boot bindings 215 shown in FIG. 12 as being a toe binding 217 and a heel binding 219. A mounting plate 221 is provided to attach the skis 211 to the sled 209 and includes a collar 223 mounted thereon which collar 223 is placed around a medial portion 225 of a side frame 227 of the sled structure 209. The mounting plate 221 is rotatable relative to the side frame 227 about a longitudinal axis of collar 223. The mounting plate 221 is of the same dimensions as a sole (not shown) of a ski boot and which fits into the conventional bindings 215 of the skis 211 in the same manner a ski boot (not shown) fits thereinto. The mounting plate 221 further includes detente plates 228 extending downwardly from sides thereof to resist any tendency of the mounting plate 221 to slip sideways out of the ski bindings 215 as is the usual case when a skier is using such bindings 215 in order to prevent leg injuries.

The sled 209 includes tip binding glove portions (not shown) which are similar in design and function as glove portions 137 and 139 of the embodiment as shown in FIGS. 1 through 11.

A user of the sled structure 209 would be able to use a conventional pair of snow skis 211 as runners for the sled 209 simply by slipping the mounting plate 221 into the conventional ski boot binding 215 and the tips of skis (not shown) into the tip binding glove portions (not shown).

FIG. 13 is a cross-sectional view taken generally transversely of a main frame 235 of a third embodiment of a sled structure 237 according to the present invention. It is noted that the main frame 235 includes cross bows 239 and side frame members 241. The cross bows 239 and side frame members 241 have resting thereon, a platform 243 on which a user of such a sled could recline. The cross bows 239 are curved downwardly in the middle to lower the center of gravity of the sled structure 237. In doing so, greater stability and turning capability is achieved.

It is noted that as shown in FIG. 13, runners 243 of sled 237 are initially rotated about their respective longitudinal axes when secured to the sled such that the outside edges of each runner are higher than the inside edges thereof. In doing so, greater stability is achieved in the sled.

FIGS. 14 through 18 show a fourth embodiment of the present invention showing a sled structure 250 having a frame 251 runners 252 and 253 and a steering mechanism (not shown ) similar to steering mechanism 17 of sled structure 1 shown in FIGS. 1 and 2. The runners 252 and 253 are attached to the sled frame 251 by means of collars 255 and 256. The runners 252 and 253 rotate about a longitudinal axis of the collars 255 and 256 respectively when turning as by utilizing the steering mechanism as explained previously. The runners 252 and 253 are further attached to their respective collar by means of plates 258 and 259 respectively. In order to limit the rotation of the runners 252 and 253 about their respective longitudinal axis, stops 260 are provided attached to the main frame 251. As the runners 252 and 253 rotate, the collar plates 258 and 259 respectively contact side edges of the stops 260 thereby limiting the allowed rotation of the runners 252 and 253.

It has been found that when utilizing the steering mechanism to effectuate a slight turn such that the runners 252 and 253 are not fully rotated with their respective collar plates 258 and 259 positioned against the stops 260, and because of the inherent flexibility of the runners 252 and 253, the two runners 252 and 253 can assume a different angle of rotation about their respective longitudinal axis. Further, it has been found that when only slightly turning, the runners 252 and 253 can actually rotate in opposed directions about their longitudinal axis at their points of connection to the collar plates 258 and 259. This produces instability. In order to overcome such instability, a transverse link 262 is attached to the collars 255 and 256 to force the two runners 252 and 253 to rotate in concert about their respective longitudinal axis at the collar plates. As shown herein, the transverse link is pivotally attached by a suitable means such as by pivot pins 263 to a vertical lever arm 264 which extends upwardly from each respective collar plate 258 and 259. The lever arms 264 are securely attached to the collar plates 258 and 259 such that they do not rotate therewith. As shown in FIG. 14, the points of attachment between the respective lever arms 264 and the transverse arm 262 lie generally vertically above the axis of rotation of the respective collar 256 and 255 on the frame 251 when bottom surfaces of both runners 252 and 253 are horizontal. In this orientation, the degree of rotation of each of the runners 252 and 253 when turning is the same.

At times, it has been found to be desirable to have the runners of the sled structure rotated inwardly slightly meaning that the runners 252 and 243 are initially rotated such that inner edges 265 thereof contact the snow surface only when the steering mechanism is positioned for straight running of the sled. This has been found to increase stability of the sled when traveling straight. In order to effectuate this initial inward canting of the runners, the transverse link 262 is comprised of two portions 266 and 267 which are connected by a turnbuckle 268. The turnbuckle is rotatably attached to transverse rod portion 266 and threadably received over a threaded portion of transverse rod portion 267. A lock nut 269 is provided such that a user of the sled structure 250 can retain the desired degree of initial canting of the runners 252 and 253.

FIG. 18 shows the sled structure 250 equipped with a vertical lever arm 270 which allows adjustability of positioning the pivotal attachment point between the transverse link 262 and the lever arm 270 relative to a vertical line extending through the respective axis of rotation of each runner 252 and 253. The purpose of this will be explained presently.

The lever arm 270 is securely attached to each collar 255 and 256 so as to extend vertically thereabove. The lever arms 270 each include an upper horizontal portion 272 extending laterally outwardly from the sled frame 251 when the bottom surface of the two runners are horizontal. The respective lever arm horizontal portions include a series of apertures 274 therein in one of which is received the transverse rod pivot pin 263.

The reason for providing such a variation of attachment points between the transverse link 262 and the vertical lever arms 270 is that it has been found when turning to be desirable to have the inner runner of the sled edge or bite more into the snow than the outside runner. This assures that the friction force produced by the outer runner is less than that produced by the inner runner thereby lessening any tendency of the sled 250 to tip over by rotating about the outside runner.

By attaching the transverse rod 262 to the respective lever arms 270 at points which lie outwardly of a vertical line passing through the respective runner axis of rotation, the degree of rotation of the inner runner is greater than that of the outer runner. As shown in FIG. 18, a user of the sled can experiment with the results produced by attaching the transverse link 262 to the various lever arm attachment apertures 274.

It is to be understood that while certain embodiments of the present invention have been illustrated and described herein, it is not to be limited to the specific forms or arrangement of parts described and shown.

What is claimed and desired to secure by Letters Patent is:

1. A sled for traversing a snow covered surface comprising:
   (a) an elongate frame having a pair of side frame members extending from each side thereof;
   (b) a platform attached to said frame for the positioning of a user of said sled thereon;
   (c) a pair of elongate flexible runners each connected to a respective side frame member, each of said runners being pivotally mounted by a pivot member for rotation about a longitudinal axis relative to a respective side frame member near a middle longitudinal portion of said runner;
   (d) steering means connected to each of said runners to rotate a front portion of each of said runners about the respective longitudinal axis thereof; and
   (e) connecting means positioned between said runners at said respective middle longitudinal portion thereof to urge said middle longitudinal runner portions to rotate about said respective longitudinal axes in concert;
   (f) said connecting means comprising a lever arm extending vertically upwardly from each of said runners and non-rotatably associated therewith; and
   (g) a transverse link extending between said lever arms and pivotally attached thereto such that rotation of one of said runners about a respective longitudinal axis thereof rotates the other of said runners about the respective longitudinal axis thereof, and including
   (h) rotation variation means to vary the amount of rotation of one of said runners relative to the amount of rotation of the other of said runners whereby when turning, an inner runner of said sled rotates more than an outer runner of said sled.

2. The sled structure as set forth in claim 1 wherein said rotation variation means comprises:
   (a) a vertical lever arm extending upwardly from each of said runners and non-rotatably connected therewith, said lever arms each including a horizontal portion having a series of spaced apertures therein; a portion of which lie outwardly from a vertical plane extending through an axis of rotation of said respective runner when a bottom of said respective runner is horizontally oriented, and wherein:
   (b) said transverse rod is extendable and has a bore located at each end thereof, said bores each mateable with an associated one of said lever arm apertures and pivotally connectable therewith by means of a pivot pin.

3. The sled structure as set forth in claim 2 wherein:
   (a) said transverse rod comprises two portions connected by means of a turnbuckle rotatably connected to a first portion of said transverse rod and threadably received onto a second portion of said transverse rod, said turnbuckle including a lock nut to retain said transverse link in a desired length.

* * * * *